March 13, 1951 F. MARTINDELL 2,545,207

MESSAGE NUMBERING DEVICE

Filed Dec. 20, 1949

INVENTOR
FRANK MARTINDELL
BY Emery Robinson
ATTORNEY

Patented Mar. 13, 1951

2,545,207

UNITED STATES PATENT OFFICE 2,545,207

MESSAGE NUMBERING DEVICE

Frank Martindell, Western Springs, Ill., assignor to Teletype Corporation, Chicago, Ill., a corporation of Delaware Application December 20, 1949, Serial No. 134,007

7 Claims. (Cl. 178—17)

The present invention deals with printing telegraph apparatus and more particularly with apparatus for introducing message numbering, identifying signals, or other intelligence into or between consecutive messages.

It is well known in the printing telegraph art to use numerical identification as a method of identifying messages. However the practice of having an operator type out the message numbering signals as a part of the original message is inconvenient and leads to numerous errors, such as the same identifying number being utilized on consecutive messages due to an operator's neglecting to check off a number on a check list after it has once been used, etc.

To avoid the inconveniences attending the manual insertion of message numbering signals into or between messages, attempts have been made to utilize auxiliary transmitters for this purpose. In general such auxiliary numbering transmitters consist of a regular message transmitter modified so as to respond to a certain predetermined signal, and upon such response a previously prepared control form causes a numerical identification signal to be transmitted. This method has proved satisfactory; however, it involves the expense of an additional transmitter at each transmitting station.

The principal object of the present invention is to provide a mechanism applicable to a transmitter of the type shown in the patent to M. T. Goetz, No. 2,296,845, in order to render such transmitter capable of transmitting automatically message identifying or numbering signals, in addition to its being able to transmit normal messages previously stored in tape form.

In connection with the principal object of the invention it is a more specific object to provide a device for controlling the tape sensing levers of a transmitter in order to enable transmission thereby of message identification signals.

Briefly the present invention consists of a rotatable unit, having a plurality of planetary numbering or message identifying cams, positioned above the tape sensing pins of a standard telegraph transmitter, of the type disclosed in the aforementioned patent of M. T. Goetz. In the normal stop position of the device, in accordance with the well known five unit Baudot code, a "letters" control indicia in the rotatable unit is positioned above the tape sensing pins. This "letters" signal, consisting of all five marking units, therefore presents no obstacle to the tape sensing pins in sensing the message tape. At the beginning of each message at the point in the transmission where it is contemplated the message identification signals will be transmitted, the standard message tape is perforated with a series of "letters," or all marking signals. The "letters" signals present no obstacle to the tape sensing pins and therefore while the tape is stepped through a plurality of character positions, the rotatable identifying unit is also stepped through its series of positions while the sensing pins pass through the tape and sense the identification signals impressed into the control cams. Upon the sensing pins sensing the entire group of planetary control cams, rotation of the rotatable unit containing the cams ceases with the unit in its normal stop position. Thereafter the message tape controls the transmitter sensing levers.

It is therefore apparent that another object of the present invention is to provide a cheap and efficient device which may be affixed to a standard telegraph transmitter to thereby render such transmitter capable of automatically transmitting message identifying signals as well as normal message signals.

Other objects and advantages of the invention will be apparent from the following detailed description when read in conjunction with the appended drawing wherein.

Figures 1, 2, 3:
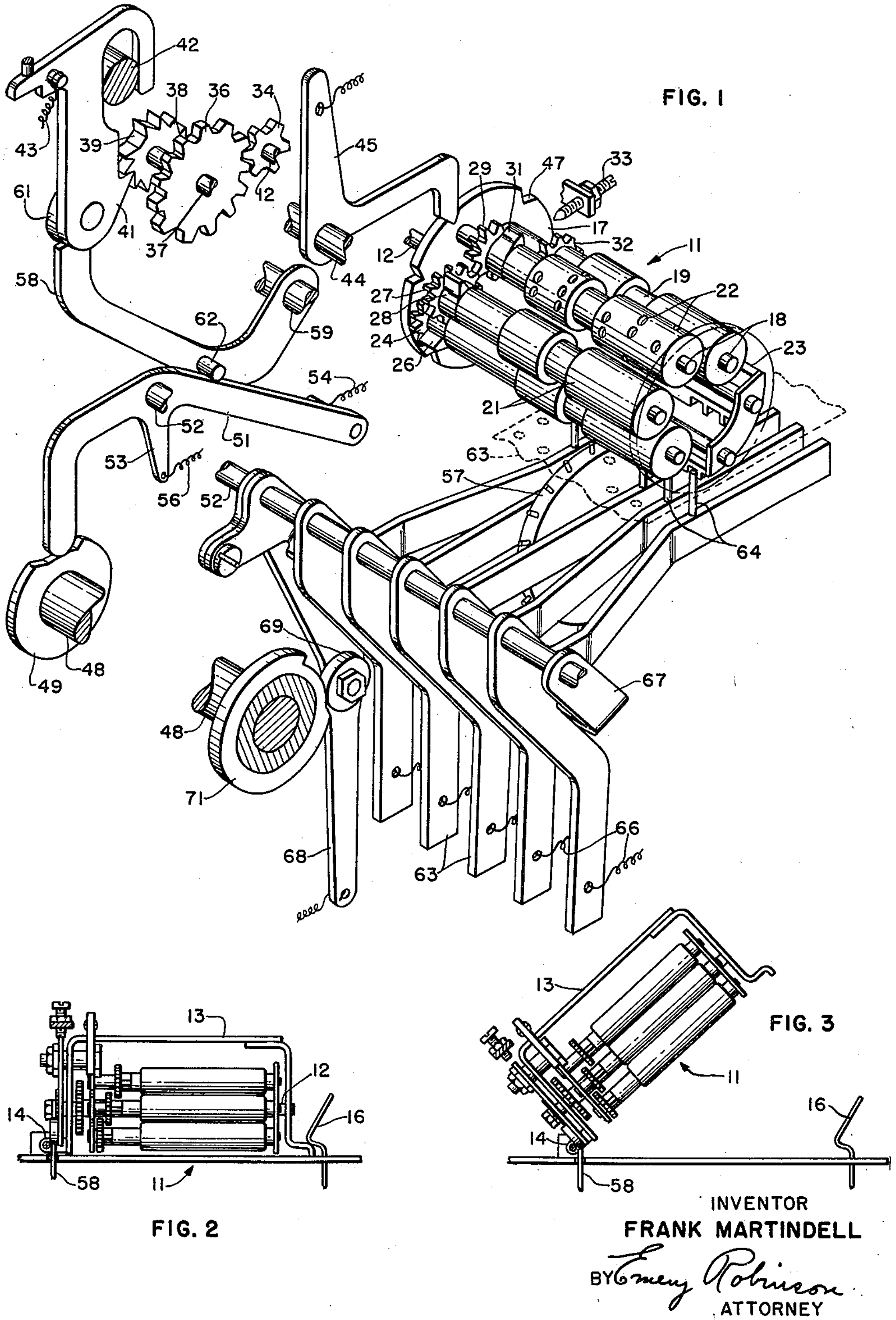
Fig. 1 is an exploded isometric view of the principal features of the invention.
Figs. 2 and 3 are comparative views illustrating how the rotatable unit is stepped from its normal stop position each time a new message tape is placed in transmitting position.

Inasmuch as the present invention deals with a device to be applied to the transmitter shown in the aforementioned patent to M. T. Goetz, No. 2,296,845, only those parts of the transmitter will be described which are deemed necessary to a full understanding of the present invention. This patent to M. T. Goetz is hereby incorporated by reference into the present disclosure and for a more thorough understanding of the message transmitter reference should be had to said patent.

Referring now to the drawings a rotatable unit designated generally by reference numeral 11 is mounted upon a shaft 12 rotatably mounted within a frame or carriage 13. The frame 13 is pivotally mounted on the top plate (not shown) of the transmitter shown in the aforementioned Goetz patent by means of a pair of ears 14. A spring clamp 16 is provided for retaining the unit in the position shown in Fig. 2.

The rotatable unit 11 has a pair of discs 17, only one of which is shown, which are secured to the rotatable shaft 12 and between which are mounted a plurality of planetary shafts 18. Each of the shafts 18 has a sleeve 19 rotatable therearound and each of the sleeves 19 has a pair of control cams 21 secured thereto. The control cams 21 are each coded with perforations or apertures 22 which represent identification or numeral signals. A portion of the rotatable unit 11, instead of being provided with planetary control cams 21 consists of a cylindrical segment 23 which is also coded with signals. The cylindrical segment 23 provides a convenient means for enabling transmission of a fixed identification signal such as the call letter of the transmitting station the "figures" signal to condition the receiving printer, and also the "letters" signal which presents itself while the rotatable unit 11 is in its normal stop position.

The rotatable unit will generally, though not necessarily be designed to cause the transmission of numeral signals and accordingly each planetary cam 21 is coded with the digits 0 to 9, inclusive. It is therefore desirable that the numeral signal transmitted be changed consecutively for consecutive messages. Accordingly each sleeve 19 except the one on which the thousands cams 21 are mounted, is provided with a ten tooth gear and a single tooth gear. A ten tooth gear 24 and a single tooth gear 26 are mounted on the units cam sleeve 21; a ten tooth gear 27 and a single tooth gear 28 are mounted on the tens cam sleeve 21; a ten tooth gear 29 and a single tooth 31 are mounted on the hundreds cam sleeve 21; and a ten tooth gear 32 alone is mounted on the thousands cam sleeve 21. During each revolution of the rotatable unit 11, a set screw 33 engages a tooth on the ten tooth gear 24 on the units cam sleeve 21. As the rotatable unit 11 moves on, the units cam sleeve 21 advances a step. Every ten steps of the units cam sleeve, the single tooth gear 26 engages the gear 27 on the tens cam sleeve. In this manner the cam sleeves are stepped sequentially. The engagement between the set screw 33 and the gear 24 may take place in any position of the rotatable unit 11. However it may more conveniently take place during a portion of a revolution of the unit 11 when none of the control cams 21 are controlling transmission.

The shaft 12, to which the rotatable unit 11 is secured, also carries a gear 34. The gear 34 meshes with a gear 36 secured to a shaft 37. On the other end of the shaft is mounted a ratchet 38 which has a missing tooth indicated by the reference numeral 39. A pawl 41 is slidable vertically on a shaft 42 and is continuously urged downwardly and counterclockwise by means of a spring 43 against the ratchet 38. Each time, the pawl 41 is raised it tends to engage a tooth on the ratchet 38 and thereby advances the ratchet a step to in turn rotate the rotatable unit 11 a step. A detent 45 mounted pivotally on a shaft 44 is continuously urged in a clockwise direction by a spring 46 into engagement with the disc 17. The disc 17 has a plurality of notches 47 within which the detent 45 may seat itself to retain the rotatable unit in its stepped position.

A power sleeve 48 has a cam 49 with which a follower lever 51 cooperates. The follower lever 51 is the same as the lever 51 shown in Fig. 5 of the aforementioned patent to M. T. Goetz. The lever 51 is pivotally mounted on a shaft 52 and has a depending arm 53 secured thereto. A pair of springs 54 and 56 secured respectively to the lever 51 and depending arm 53 constantly tend to rotate the follower 51 counterclockwise thereby keeping it in continuous engagement with the cam 49. When the lever 51 drops into the low part of the cam 49 a tape feed wheel 57 is advanced by means shown in the Goetz patent hereinbefore referred to. A lever 58 mounted pivotally on a shaft 59 is designed to actuate the pawl 41 through an adjustable eccentric 61. The spring 43 constantly urges the pawl 41, and in turn the lever 58 downwardly, thereby retaining a stud 62 protruding from the lever 58 in contact engagement with the follower lever 51. When the follower lever 51 is allowed to pivot counterclockwise, due to the presentment of the low part of the cam 49, the tape feed wheel 57 is advanced a step which causes the advancement of a tape 63, and the pawl 41 is raised to cause the advancement by one step of the rotatable unit 11.

A group of sensing levers 63 mounted pivotally on the shaft 52, each have a tape sensing pin which is designed to sense perforations in the tape 63 and the apertures 22 in the identification control cams 22. Each of the sensing levers 63 is urged counterclockwise about the shaft 52 by individual springs 66. A bail 67, also mounted pivotally on the shaft 52 has a depending arm 68 carrying a follower roller 69 which rides a cam 71 rotatable with the cam sleeve 48.

The following is a description of the operation of the invention. It will be first assumed that the transmitter has completed transmission of a message in a tape 63. Under this condition the rotatable unit 11 is in, and remains in, its normal stop position because of the fact that the portion of the ratchet 38 having the missing tooth 39 is opposite the pawl 41. At this time the pawl 41 does not advance the ratchet 38 because the pawl 41 does not drop far enough to engage another tooth, but merely reciprocates in the portion 39 of the ratchet during the oscillation of the follower 51. It will be recalled that also at this time a "letters" combination in the cylindrical segment 23 presents itself opposite the sensing pins 64.

When the operator desires to insert a new message tape into transmitting position such tape is placed over the sensing pins 64. In order to insert the new tape in this position it is necessary that the rotatable unit 11 be lifted out of the way. The spring clamp 16 is moved slightly to the right and this allows the unit 11 to be pivoted counterclockwise thereby making it possible to insert a new message tape. When the unit 11 occupies the position shown in Fig. 2 the lever 58 will not allow the pawl 41 to drop sufficiently to pick up a new tooth on the pawl 38. However, when the unit 11 is moved to the position shown in Fig. 3 the pawl 41 is moved from engagement with the lever 58 so that the spring 43 is able to draw the pawl 41 into a position to engage the next tooth beyond the toothless portion 39 of the ratchet 38. Upon the subsequent latching of the unit 11 in the position shown in Fig. 2 with the new message tape in transmitting position, the pawl 41 is in engagement with a tooth on the ratchet 38. Upon the subsequent reciprocation of the lever 51, both the tape 63 and the rotary unit 11 are advanced. Since the first few spaces on the new message tape contain "letters" combinations, the sensing pins sense consecutive control cams 21 and the cylindrical segment 23. Upon the completion of a revolution of the rotary unit 11, the toothless portion 39 of the ratchet 38 presents itself to the pawl 41 and thereafter the message itself is sensed in the message tape 63 while the rotary unit 11 remains stationary.

It is to be understood that more or less control cams 21 may be used and also that a larger cylindrical segment 23 with more characters coded therein may be used if so desired. It is to be further understood that numerous other changes and modifications may be made in the invention without departing from the spirit and scope thereof.

What is claimed is:

1. In a telegraph transmitter, a plurality of sensing pins for sensing a message tape, a rotatable unit positioned above said sensing pins and said message tape, a plurality of planetary cams in said rotatable unit, each of said planetary cams being coded with message identifying intelligence designed to be sensed by said sensing pins, means for advancing said message tape in a stepped manner to present successive intelligence groups therein to said sensing pins, means for rotating said rotatable unit in a stepped manner to present intelligence of successive planetary cams to said sensing means, said message tape being coded in a manner to present no obstacle to said sensing pins in sensing said planetary cams, and means for stopping the stepping of said rotatable unit upon completion of a revolution thereof, said rotatable unit being coded in a manner to present no obstacle to said sensing pins in sensing said message tape after the stopping of the stepping thereof.

2. In a telegraph transmitter, a plurality of sensing pins for sensing a message tape, a rotatable unit positioned above said sensing pins and said message tape, a plurality of planetary cams in said rotatable unit, each of said planetary cams being coded with message identifying intelligence designed to be sensed by said sensing pins, means for advancing said message tape in a stepped manner to present successive intelligence groups therein to said sensing pins, means for rotating said rotatable unit in a stepped manner to present intelligence of successive planetary cams to said sensing means, said message tape being coded in a manner to present no obstacle to said sensing pins in sensing said planetary cams, means for stopping the stepping of said rotatable unit upon completion of a revolution thereof, said rotatable unit being coded in a manner to present no obstacle to said sensing pins in sensing said message tape after the stopping of the stepping thereof, and means for permutably changing the relative settings of said planetary cams between each revolution of said rotatable unit to thereby successively change the message identifying intelligence sensed by said sensing pins.

3. In combination with a telegraph transmitter having a plurality of sensing pins for normally sensing a message tape, a rotatable unit removably mounted on said transmitter, a plurality of planetary cams in said rotatable unit each coded with message identifying intelligence designed to be sensed by said sensing pins, means for advancing said message tape in a stepped manner to present successive intelligence groups therein to said sensing pins, and pawl and ratchet means for rotating said rotatable unit in a stepped manner to present intelligence from successive planetary cams to said sensing pins, said pawl and ratchet means being designed to permit but a single revolution of said rotatable unit upon insertion of said message tape in the transmitter, said rotatable unit itself being coded in a manner to present no obstacle to said sensing pins in sensing said message tape after said single revolution of said rotatable unit, and said message tape being coded in a manner to present no obstacle to said sensing pins in sensing said planetary cams during the rotation of said rotatable unit.

4. In combination with a telegraph transmitter having a plurality of sensing pins for normally sensing a message tape, a rotatable unit removably mounted on said transmitter, a plurality of planetary cams in said rotatable unit each coded with message identifying intelligence designed to be sensed by said sensing pins, means for advancing said message tape in a stepped manner to present successive intelligence groups therein to said sensing pins, and pawl and ratchet means for rotating said rotatable unit in a stepped manner to present intelligence from successive planetary cams to said sensing pins, said ratchet means having a missing tooth for permitting said pawl and ratchet means to step said rotatable unit no more than a single revolution upon insertion of said message tape in the transmitter, said rotatable unit itself being coded in a manner to present no obstacle to said sensing pins in sensing said message tape after a single revolution of said rotatable unit and said message tape being coded in a manner to present no obstacle to said sensing pins in sensing said planetary cams during the rotation of said rotatable unit.

5. In a telegraph transmitter, a plurality of sensing pins for sensing a message tape, a rotatable message identification unit, a carriage for housing said message identification unit mounted pivotally on said transmitter and movable to either a message tape inserting position or a message transmitting position, said message identification unit being rotatable in said carriage and having a plurality of planetary cams coded with message identifying intelligence adapted to be sensed by said sensing pins when said carriage occupies said message transmitting position, means for rotating said message identification unit a single revolution and preventing further rotation thereof when said carriage occupies said message transmitting position whereby said sensing pins sense the message identifying intelligence coded in said planetary cams and thereafter sense the message tape, and other means effective upon movement of said carriage to said message tape inserting position and back to said message transmitting position for rendering said first mentioned means effective to rotate said message identification unit another revolution.

6. In a telegraph transmitter, a plurality of sensing pins for sensing a message tape, a rotatable message identification unit, a carriage for housing said message identification unit mounted pivotally on said transmitter and movable to either a message tape inserting position or a message transmitting position, said message identification unit being rotatable in said carriage and having a plurality of planetary cams coded with message identifying intelligence adapted to be sensed by said sensing pins when said carriage occupies said message transmitting position, a pawl and ratchet for rotating said message identification unit when said carriage occupies said message transmitting position, said ratchet having a missing tooth for insuring but a single revolution of said identification unit, said sensing pins being effective to sense the message identifying intelligence coded in said planetary cams during rotation of said identification unit and thereafter to sense the message tape, and means effective upon movement of said carriage to said message tape inserting position and back to said message transmitting position for rendering said pawl and ratchet effective to rotate said message identification unit another revolution.

7. In a telegraph transmitter, a plurality of sensing pins for sensing a message tape, a rotatable message identification unit, a carriage for housing said message identification unit mounted pivotally on said transmitter and movable to either a message tape inserting position or a message transmitting position, said message identification unit being rotatable in said carriage and having a plurality of planetary cams coded with message identifying intelligence adapted to be sensed by said sensing pins when said carriage occupies said message transmitting position, a pawl and ratchet for rotating said message identification unit when said carriage occupies said message transmitting position, a power driven lever for actuating said pawl, said lever being further effective in conjunction with a portion of said ratchet having a missing tooth for insuring but a single revolution of said message identification unit, said sensing pins being effective to sense the message identifying intelligence coded in said planetary cams during rotation of said message identification unit and thereafter to sense the message tape, and means effective upon movement of said carriage to said message tape inserting position and back to said message transmitting position for rendering said pawl and ratchet effective to rotate said message identification unit another revolution.

FRANK MARTINDELL.

REFERENCES CITED

The following references are of record in the file of this patent:

UNITED STATES PATENTS

| Number | Name | Date |
|---|---|---|
| 2,193,809 | Dirkes et al. | Mar. 19, 1940 |
| 2,451,045 | Potts | Oct. 12, 1948 |